United States Patent [19]
Allen

[11] 3,968,276
[45] July 6, 1976

[54] PROCESS FOR THE PRESERVATION OF WOOD

[75] Inventor: William R. Allen, Hackettstown, N.J.

[73] Assignee: Diversified Wood Products, Inc., Hackettstown, N.J.

[22] Filed: July 12, 1974

[21] Appl. No.: 488,020

Related U.S. Application Data

[63] Continuation-in-part of Ser. No. 300,496, Oct. 25, 1972, abandoned.

[52] U.S. Cl. .................................. 427/297; 21/7; 427/325; 427/440
[51] Int. Cl.² ..................... B05D 3/00; B05D 1/18
[58] Field of Search ............ 117/59, 116, 119, 147; 21/7; 427/297, 325, 440

[56] References Cited
UNITED STATES PATENTS

| 2,140,981 | 12/1938 | Booty et al. | 117/59 |
| 2,352,740 | 7/1944 | Shannon | 117/59 |
| 2,591,768 | 4/1952 | Austin | 117/116 |
| 2,652,347 | 9/1953 | Hudson | 117/59 |
| 2,668,779 | 2/1952 | Herman | 117/59 |
| 2,740,728 | 4/1956 | Sonnabend et al. | 117/59 |
| 2,786,784 | 3/1957 | Henriksson | 117/116 |
| 2,947,648 | 8/1960 | Sonnabend et al. | 117/59 |
| 3,160,515 | 12/1964 | Goldstein et al. | 117/59 |
| 3,200,003 | 8/1963 | Beicher | 117/147 |
| 3,429,733 | 2/1969 | Wolf et al. | 117/136 |
| 3,677,805 | 7/1972 | Barnett | 117/116 |

Primary Examiner—Michael R. Lusignan
Attorney, Agent, or Firm—Buell, Blenko & Ziesenheim

[57] ABSTRACT

A process for the treatment of wood of all kinds to impregnate the wood fully to its core with a resin component system, simultaneously with, or without, a flame retarding agent, or preservative, the process involving enclosing the wood in a chamber, evacuating the chamber in which it is enclosed in a slow time cycle, related to the structure of the wood, while adding a prepolymer aqueous solution to submerge the wood, continuing the vacuum, securing the vacuum, and applying pressure of prepolymer solution until the wood reaches the refusal point and, in certain more dense woods, repeating the vacuum and pressure cycle; then completely purging the chemicals, evacuating the chamber and drawing a final vacuum on the wood for removal of surface liquid, and finally removing wood from the chamber.

17 Claims, 1 Drawing Figure

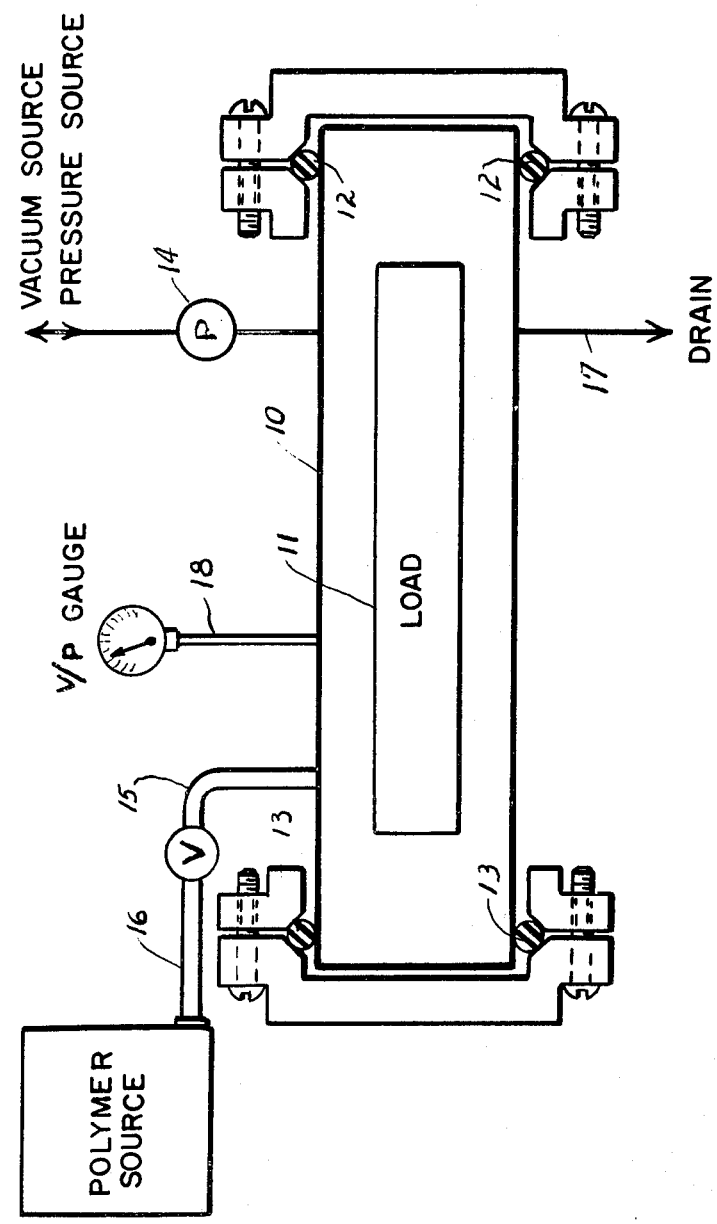

PROCESS FOR THE PRESERVATION OF WOOD

RELATED APPLICATIONS

This application is a continuation-in-part of my co-pending application Ser. No. 300,496 filed Oct. 25, 1972 now abandoned.

DESCRIPTION OF THE INVENTION

This invention relates to a process for the impregnation of wood of all varieties with a resin, preservatives and flame retardant, to the core of the wood so as to develop a product wherein the heart wood is thoroughly treated so as to be resistant to bacterial and fungal deterioration, as is the sap wood, thus to diversify the usefulness of the wood, and the process of preparing the same, which involves the manipulation of the wood with the cycle adjusted to the variety of the wood to give the results indicated.

BACKGROUND OF THE INVENTION

It is an understatement to say that literature dealing with timber, harvesting, sawing, and processing using chemicals for the preservation of timber is broad. It is vast. Timber which is used in substantial quantity in all parts of the civilized world is perhaps one of the most versatile known materials of construction, but has the disadvantage that it is perishable, despite a substantial natural durability of some woods. The properties of the wood, the natural durability, and its treatment, are well summarized in a BWPA Annual Convention Report, The Marketing of Treated Fencing In The British Isles, by C. S. Smith, wherein a substantial body of literature is identified and the state of the art in 1972 is well summarized, particularly in relation to the preservation of wood. Further annotation of the state of the art is to be found in a variety of publications of the Forest Products, Research Laboratory of England, United States Department of Agriculture, United States Forest Service, and a variety of their publications available through the United States Government Printing Office. Much is reported on the preservation of wood particularly with creosote in impregnation and various treatments involved in delaying the onset of fungal and bacterial deterioration of wood in use, particularly in moist areas, especially ground contact.

The problem of extending the life of wood in structures is important and much literature is also available in the annotation of the treatment of mill work and joinery and structural work which is used in the construction of homes. This type of material is to be found in the patent literature where it is conveniently classified in Class 117, subclasses 116 and 117, in the United States Patent Office; particularly where some effort has been made at the total impregnation of wood reference can be had to any of the following United States Patents:

| | | |
|---|---|---|
| 285,087 | September 18, 1883 | G. S. Valentine |
| 609,442, | August 23, 1898 | G. F. Lebioda |
| 645,793, | March 20, 1900 | C. J. Doyle |
| 836,592 | November 20, 1906 | J. T. Logan |
| 917,265 | April 6, 1909 | B. Diamand |
| 1,146,501 | July 13, 1915 | H. G. Jennison |
| 1,422,119 | July 11, 1922 | Meyer - Walsh |
| 1,602,417 | October 12, 1926 | G. B. Shipley |
| 1,602,933 | October 12, 1926 | R. D. Prittie |
| 1,631,532 | June 7, 1927 | A. G. Howerton |
| 1,697,248 | January 1, 1929 | Lauter |
| 2,039,393 | May 5, 1936 | J. R. Coolidge et al |
| 2,947,648 | August 2, 1960 | L. F. Sonnabend et al |
| 2,740,728 | April 3, 1956 | L. F. Sonnabend et al |

Other literature available through British Forest Products Research Laboratories is as follows:

"The Preservative Treatment Of Home-Grown Timbers by Diffusion", D. N. Smith and R. Cockcroft, reprinted from 'WOOD', Vol. 26, pp. 490–492, December 1961.

"Selecting A Preservative Treatment To Incorporate In The Manufacture of Joinery", Ministry of Technology.

"Ensuring Good Service Life For Window Joinery", Technical Note No. 29, May 1968.

"The Natural Durability Classification Of Timber ", Technical Note No. 40, October 1969.

"Preservation Of Building Timbers By Boron Diffusion Treatment", Technical Note No. 41, October 1969.

"Preservative Treatments For External Softwood Joinery Timber", Technical Note No. 24, Revised April 1971.

"Timber Preservatives and Methods of Treatment", R. Cockcroft, Timberlab Papers, No. 46, 1971.

"Wood Preservation By The Boron Diffusion Process - The Effect Of Moisture Content On Diffusion Time", D. B. Smith and A. I. Williams, Timberlab Papers, No. 5, 1969.

"The Comparative Resistance To Fire Of Various Species Of Timbers", J. Bryan and J. S. Doman, reprinted from 'WOOD', January 1940.

"Factors Affecting The Introduction Of Preservatives Into Wood", W. B. Banks, Pestic. Sci. 219–227, 1972.

"Wood Treatment Resin Forming Systems", United States Department of Agriculture, United States Forest Service, Booklet R 1703.

"Resin Treated Wood", United States Department of Agriculture, United States Forest Service, Booklet 1380.

While the literature on the subject is extensive and the general principle is recognized that wood is porous and that it should be possible to penetrate the wood with preservatives and resin components, actual practice in the art as known in 1972 indicates that even under extreme vacuum and pressure conditions, whether the wood be positioned horizontally or vertically in the impregnation tank, the usual impregnation runs into the heart wood hardly more than a few millimeters. Accordingly, specifications generally call for treatment of pieces which have been sawed to dimension and if they are sawed on the site of construction specifications call for treatment of the fresh cut areas.

It is in this light that it is apparent that a process which actually reliably penetrates timber or wood with resins, preservatives, or flame retarding agents and the process for so doing constitutes a genuine positive contribution to the art.

It is, accordingly, the object of this invention to provide a process for the production of fully impregnated wood, the wood being impregnated to its core with resin components, e.g. phenol-formaldehyde and variants, together with preservatives which can be surplus formaldehyde and flame retarding agents which can be known, or novel, based on organic halogen compounds.

Other objects and advantages of the invention will in part be obvious and in part appear hereinafter from the consideration of the details of the process as it is related to type woods.

DETAILED DESCRIPTION OF THE INVENTION

This invention is accordingly embodied in a process for the manipulation of resin reactant solutions, with preservative and flame retardant as optional ingredients, in a manner such that these materials whether soluble or insoluble in water can, in aqueous medium, be used for the impregnation of wood. In the process the wood can be held in a horizontal or vertical position in a chamber, that is the grain can be held horizontal or vertical, the chamber closed and the evacuation carried out in a manner related to the properties of the wood and the structure of the cells. Thus, the wood is first enclosed, the wood being in any condition whether dry or fresh cut and green, the chamber being then sealed and evacuated in a careful cycle which is related to the species of wood, but generally the period of evacuation is extended over twenty minutes to an hour, and the pressure in the sealed chamber is brought to a level of about two inches of mercury or less. The purpose of this step is to remove air and wood volatiles from the wood, and the purpose of the careful cycle is to give the air and the volatiles in the wood sufficient time to come out of the wood. Finally, after having reached the appropriate level of vacuum and having removed substantially all volatiles, as indicated by the fact that the degree of vacuum holds with relatively little additional pumping, allowing the aqueous phenol-formaldehyde prepolymer resin solution in any useful low concentration to about 40% of the resin components in prepolymer or monomer form to be drawn into the chamber. The amount of the solution should be sufficient to immerse the wood fully. Following this step, the vacuum is continued and held for a period dependent on the nature of the wood. Thereafter, the vacuum is secured by completely filling the chamber with solution and closing off the vacuum pump, and commencing application of pressure to the closed system, to the point of total refusal of further solution by the system.

In some more difficult cases where the species of wood presents fine dense pores, after the first cycle of pressure, it may be desirable to repeat the vacuum pressure cycle.

The details of the process, pressure ranges, concentration ranges of resin and the cycling of vacuum pressure with respect to a particular species of wood can be better judged from the details of the process as set forth in the following specification.

In the drawing accompanying this specification I have set forth a typical flow diagram showing the layout of a reactor chamber and plumbing for accomplishing the impregnation. Generally, it should be understood that the important element is the impregnation tank 10 which has to be large enough to receive a charge of wood 11 of the size desired, sealable, e.g., at 12 and 13, to hold pressure, and then must be equipped with appropriate pump 14, feed lines 15 and 16, withdrawal line 17, and control elements 18 to make possible the cycling and the variations of cycling it is sought to achieve.

As the resin components for the impregnation, it is to be understood that any liquid carrying non-resinous resin forming material capable of undergoing a condensation reaction under controlled temperature conditions, or induced by a catalytic material, to form resin may be employed in the process. Economics dictates water as the liquid medium and generally phenol-formaldehyde as the resin prepolymer. Typical suitable liquid materials for forming a resin are aqueous solutions of phenol-formaldehyde prepolymer, cresol and formaldehyde, chlorinated phenols and cresols and formaldehyde, urea and formaldehyde, and then other aldehydes such as furfuraldehyde and phenol, or furfuraldehyde with formaldehyde and phenol and, of course, in any reaction it is to be understood that paraformaldehyde, namely, the polymeric water soluble form of formaldehyde, is eminently useful. Solutions of phenol-furfuraldehyde prepolymer and various combinations of the resin components of these phenols and aldehydes are useful. They respond accurately to the requirement of the process, namely, that they be stable at ambient temperatures, with the consequence that they can be prepared in advance, stored in the quantities that might be needed for the treatment of large amounts of wood, and be used as the impregnants for the wood as required.

The resin forming liquid is preferably free of higher condensation products thereof, although the presence of a small proportion e.g., 10 percent, by weight, or less of the same can be tolerated. The prepolymer liquid should not be converted to a higher condensation product resin before being applied to a finely porous body such as wood, since the higher condensation prepolymer resin does not penetrate as deeply or as rapidly into finely porous bodies as is desired.

The impregnation steps of the process are preceded by a step of placing the solid porous lumber in a chamber and evacuating the latter to remove air and moisture and wood volatiles from the wood. It is important that the first evacuation proceed slowly so that the pores of the wood do not collapse by too rapid withdrawal of air and moisture and wood volatiles from the chamber. This can be judged by actually listening to the chamber and keeping rate of evacuation down so that noise of collapse is avoided. Generally, by keeping rate of evacuation down to about one inch of vacuum per minute the result is achieved.

For the impregnation of wood generally, I use a water solution of phenol-formaldehyde prepolymer with about 65% solids in the stock solution. This stock solution is reduced to 30–33% solids by dilution with water; the obvious factor is approximately 100% water by volume added to the base solution. Reduction to 15% solids is useful, and 5% is about a minimum. Whether the aldehyde be formaldehyde, paraldehyde or some modification of these, furfuraldehydes or the like, the molar ratio of reactant phenolic group to aldehyde group is optimally the one for direct chemical reaction of condensate to form the water soluble prepolymer, plus a small surplus of the aldehyde. It appears that this residual aldehyde, or some fraction of it, is retained in the wood and may function as a preservative in the wood.

Where there is a difficult wood and in the tabulation reported herein I have classified a number of woods in terms of relatively easy, difficult and very difficult, a dual treatment, namely, a dual process corresponding to that which I have described as appropriate is used. That is, the initial evacuation is carried out during the 20 or 30 minute interval, held for about 30 minutes; the wood is then pressurized for about 30 minutes; the pressure reduced; vacuum again applied; and the pressure treatment cycle repeated. The level of the vacuum is 10–2 inches or less of mercury pressure.

In applying the vacuum to green lumber or any kind of green log, it should be realized that the log carries a substantial amount of moisture and hence, in these instances, the application of the vacuum is done on the slowest basis. That is, it is applied quite slowly over a 20–60 minute interval or longer to allow for removal of moisture and wood volatiles in the log. This is somewhat indicated in the evacuation cycle by the level of vacuum pumping activity that is needed to obtain and hold the vacuum. The vacuum pumping step thus applied to the green log relieves natural tensions in the log and tensions which would be exacerbated by drying and, thereby, reduces the tendency of the treated log to split or check on subsequent curing.

Thus, it is apparent that the process as I have outlined it, is useable directly on green logs, fresh from the stumps on which they were growing that very day. The end result is dimensional stabilization of the timber that has been impregnated and preserved according to this process and the timber can be used as structural wood directly after treating and cutting.

This should be contrasted with the two years or so which is required for air drying, or kiln drying which requires several weeks. Either air dried or kiln dried wood can be treated by my process, but it should be observed the process has extensive advantage because it is also applicable directly to green wood.

The following descriptions of operations will illustrate the application of my process to specific logs.

EXAMPLE I

For the impregnation of a charge of pine lumber with a typical impregnating material as prepolymer the following is useful; Since the steps of the process involve first enclosing the wood in the chamber, which may be of size which is a relatively close fit around the wood to avoid the handling of large volumes of liquid, the wood may be cut to any section, or may be in the form of logs. (If logs are used, the bark can remain in place.) The chamber is closed and generally conventional seals around the end closures as is characteristic of a typical autoclave or pressure reaction kettles are used. Evacuation of the chamber is conducted on a slow time cycle related to the species of wood. Generally, I identify the time cycle for evacuation as lasting for about 20 to 40 minutes. For example, in the handling of Western Red Cedar I employ a mild vacuum, slowly drawn at a rate 3 times as long as that which I use for pine. That is, the wet red cedar will take approximately 40 minutes for evacuation of the chamber and pine can be assumed to be complete at about 15 to 20 minutes. The purpose of evacuation is to remove air from the chamber and any air, moisture and wood volatile matter from the wood. The end point of evacuation is indicated by the gauge which holds steady with minimum or no pumping, or when the chamber itself goes silent. That is, it is possible to listen to the chamber using a stethoscope, or merely the ear, and when there is no further crackling sound the operation is complete. Vacuum is brought to 2 inches or less or mercury.

While the vacuum is being drawn down, or after it has been drawn, a preparation of water soluble prepolymer solution is allowed to enter the chamber until the wood is fully covered. This involves further evacuation to hold the low pressure in the free space above the wood.

For a period of 20–30 minutes vacuum is on the chamber. Finally the vacuum is secured and the remaining space in the chamber is completely filled with prepolymer solution. At this point, pressure is applied to the chamber to the point of refusal of solution by the wood.

In difficult cases, that is extremely dense woods, it may be desirable to develop a second vacuum - pressure cycle.

Following the final pressure cycle of 30–40 minutes, the chamber is completely purged, the solution drained and the chamber evacuated to a pressure of 10–2 inches or less of mercury, that is, to a level comparable with the initial step to remove residual solution from the surface of the timber. Thereafter the vacuum is released and the timber removed.

The preferred stock solution for the wood impregnation is a base aqueous solution of 65% solids, that is, phenol-formaldehyde in water. This is the stock solution which for actual impregnation is diluted to 30–33% solids. The solids can be reduced to as low as 5% and still achieve effective results.

In the manipulation of the wood in the vacuum chamber it is to be observed that the operation is, basically, to get the pressure down to a level of one to two inches of mercury, which effectively removes moisture and wood volatiles so that the resin solution can enter the wood. Resin solution enters the wood, pressure is applied to refusal of more solution and the reduction of pressure and application of pressure repeated as needed for various species.

In general any of the phenol-formaldehyde reactant combinations outlined herein are useful. Phenol-formaldehyde, which is the most common, is often available in commercial form as a water soluble resin prepolymer. This, diluted to a solid content in the range from 5–40%, is rendered useful. I prefer the range in which the resin solution contains about 30–33% solids but the results are useful when more dilute solutions are used. Similarly cresylic acid with formaldehyde forms a useful material. Other phenolic compounds with formaldehydes and furfuraldehyde are also useful.

In rendering wood flame retardant, it will be observed that the deposition in the wood of an amount of resin such as is achieved by my process will render the wood partially flame retardant at least. This is a consequence of the actual mechanical effect of depositing a certain amount of solid matter in the pores of the wood, thereby reducing oxygen supply to such wood should it become ignited. Hence, the resin treatment alone works a substantial reduction in the flammability of the wood.

When it is desirable to incorporate in the wood a flame retarding agent and for this purpose it is necessary only to bring the flame retarding agent into solution with the resin forming materials. For this purpose I find that the flame retarding acids converted to ammonium salts are quite useful because the mechanism is that the salt is quite soluble in water and thus enters the wood quite freely.

Normally, wood as such is sufficiently attractive for most construction purposes and the ornamentation of wood in the sense of staining to obtain different color effects has been left to subsequent treatment. In this process it is possible to incorporate into the wood a coloring agent by incorporating the agent into the aqueous medium carrying the resin. Since a water solution is my preferred medium, any water soluble coloring agent, water soluble dye, can be used. It enters the wood system together with the resin prepolymer, penetrating all the pores to the full depth of the wood, concentrating in areas in which are more porous than others, thereby creating a variegated effect which emphasizes the grain of the wood. The amount of dye to use depends upon the intensity of the color it is sought to develop. Generally, only a very small fraction of the total solid content need be dye for adequate color effect. I have found about 1% generally adequate.

While my process has been described in terms of an aqueous solution and other materials can be introduced into the wood this way, it should be noted that the process is characterized by its careful use of the vacuum and pressure in sequence. Since wood as a mechanical structure consists of a sequence of tubes or tubular pores it is possible to use a colloidal dispersion of resinous materials, flame retarding agents and coloring ingredients, provided the degree of subdivision of the materials, if they are solid dispersions or colloidal dispersions, is fine enough so that the aqueous medium in which they are carried can pass, or carry them, freely into the pores of the wood. Generally the pores of the wood are in the microscopic range and for this effect to be consistently achievable, I have found it desirable to reduce the degree of subdivision of the colloidal material to particle size of under 5 microns. With coloring material I reduce the particle size to under 2 microns so that they can be carried freely into the pores of the wood.

The manipulation for incorporating flame retarding materials or coloring material into the wood is just as is described in connection with Example I, the alteration of the formula being to include up to 1–3% of the flame retarding agent in terms of solids in the resin solution and in terms of the coloring agent depending upon intensity as much as ½–1% of the solids in the solution.

Where it is desired to incorporate a flame retarding agent into the wood an ammonium hydroxide solution of bisdibromopropyl phosphate is used and the bis compound added to the resin solution to place therein about 1–3%, by weight, total of the solution.

With the resin treatment which renders the wood bacteria proof and fungus proof and, thereby, insect retardant it is possible, inasmuch as an aqueous system of the prepolymer is used, to incorporate into the prepolymer solution a flame retardant compound in small amount, to develop a high level of flame resistance in treated products such as: shingles, water resistant plywood, (bonded with suitable adhesive), dimensional lumber, all grades whether green, air dried or kiln dried.

Laboratory tests on Oak, Red Pine, Mahogany, Yellow Pine, and Spruce to evaluate bacterial and fungal resistance are all favorable.

In drawing the vacuum on a green log and removing wood volatiles, the process is carried out in a slow manner which relieves tension on the log and I have observed it seems to avoid splitting of the log after subsequent drying.

The following tabulation gives a classification of woods in accordance with their relative porosities and relative ease of impregnation by this process with approximate indication of time cycle for the application of vacuum and pressure.

| Ease of Treatment | Species | Condition of Wood & Weight Pickup | Time of Treatment |
|---|---|---|---|
| Difficult | | | 45–75 mins. |
| | Western Red Cedar | Dry 100–150% | slow vacuum |
| | Douglas Fir | Dry 15–30% | buildup. Build |
| | Inland Fir | Dry 10–25% | pressure to 75 psi over 20 mins. repeat vacuum-press cycle hold 30 minutes. |
| Moderate to Difficult | | | 30–60 minutes slow vacuum |
| | Spruce, native and sitka | Dry 15–20% | buildup. Build |
| | Hemlock | Green 30–40% | pressure quickly to 100 psi. Hold 20 mins. repeat vacuum-pressure cycle to 100 psi hold 30 minutes. |
| Moderate | | | Pull vacuum |
| | Maple, swamp | Green 10–15% | quickly & hold |
| | Maple, sugar | Green 10–15% | vacuum 45–60 mins. |
| | Ash | Green 10–15% | Build pressure |
| | White Oak | Dry 10–15% | quickly to 150– |
| | Walnut | Dry 10–15% | 300 psi relieve |
| | Mora | Dry 10–15% | to atmos & repeat |
| | Yellow Heart | Dry 10–15% | pressure. Hold |
| | Green Heart | Dry 10–15% | 30 minutes. |
| | Black Gum | Green 75–100% | |
| | Sweet Gum | Green 75–100% | |
| | Cherry | Green 40–60% | |
| Easy to Moderate | | | Pull vacuum |
| | White Pine | Dry 75–125% | quickly-hold 15– |
| | Red Pine | Green 75–125% | 30 mins. Build |
| | Birch | Green 75–125% | pressure to 100– |
| | Beach | Green 75–125% | 200 psi. Hold |
| | Tulip Poplar | Green 75–125% | 20 minutes. |
| | Sycamore | Green 25–50% | |
| Easy | | | |
| | Red Oak | Green 40–50% | Pull vacuum |
| | Elm | Green 40–50% | quickly-hold 10– |
| | Hickory | Green 40–50% | 25 mins. |
| | Linden | Green 40–50% | Build pressure to 150 psi. Hold 20 minutes. |

Woods treated in accordance with my process upon being sawed and inspected showed penetration of sections as large as 10 and 20 inch diameter to the core of the heart wood with resin and preservative and flame retarding agent.

Laboratory tests indicated the wood was resistant to bacterial and fungal decay and was flame retardant. However, as an ultimate test of resistance to bacterial and fungal deterioration and insect attack there is no test which can replace or supersede an actual installation in the ground. Accordingly, wood treated in accordance with the cycle cited Example I constituting some substantial sections and a substantial volume of pine logs, fully impregnated with phenol-formaldehyde resin under the following specifications: 15% resin solids, plus 2% of bis salt solids, by weight, as bis acid, solution; treated 25 minutes to get down to 2 inches of mercury vacuum treatment and 15 minutes pressure cycle at 150 psi; and chamber drained of solution, was used in the construction of a revetment installed adjacent to a highway. It was deemed that the construction of the installation would be a complete success if the wood showed no deterioration by bacteria, fungi or insect invasion after five years. Inspection after nine months indicated no observable detectable invasion of the wood by bacteria, fungi, or insects. Direct application of flame from an acetylene cutting torch for 15 minutes produced deep char and merely bored a hole - ½ inch diameter to 4 inch depth, without flame or flame spread.

That is, treatment with the resin alone functions as a flame retardant because the natural porosity of the wood is significantly reduced so that the oxygen needed for combustion is cut off. By incorporating a water soluble flame retardant compound into the water system used for impregnation of the wood a considerable enhancement of the flame retardancy is obtained, which can be stated differently in that the need for the flame retardant compound per se is substantially lower than it is in an untreated wood.

For a flame retardant we use the bisdibromopropyl phosphate which answers to the following formula:

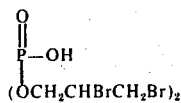

By taking advantage of the remaining acid group in the compound and ammonia, I make the ammonium salt of the bis acid to render it soluble in water and incorporate it as ammonium salt in the resin solution used for the impregnation. By thus making the compound infinitely water soluble as either the ammonium salt, or the alkali metal salt, it becomes soluble in any basic aqueous medium. The advantage of the ammonium salt is that it makes the compound water soluble.

For a few specific examples of the application of the process to wood treatment, I have added the following showing actual operating conditions and quantitative results of measurements on the woods.

EXAMPLE I

Process Run: 1179
Species: 12 × 12 inches × 8' Douglas Fir
Condition: Green
Moisture content at beginning of run: 18% (Boring taken at direct center of log - from middle third of cross section [through the heart wood]).

Timber placed in autoclave at ambient temperature, chamber closed and sealed, vacuum pumped to 26 inches mercury. Solution drawn into chamber by vacuum until timber is totally submerged. Solution source closed, vacuum pumping to 29 inches mercury and held for 5 minutes. Chamber then vented to atmosphere for 3 minutes, closed and vacuumed to 29 inches mercury for 15 minutes and secured. Solution then drawn into chamber until chamber is 100% filled and pressure pump started. Pressure brought to 300 psi, held for 10 minutes. Chamber then drained, opened and timber removed. Timber allowed to dry 72 hours and new test boring taken at 18 inches offset from centers.

Moisture content at 18 inch offsets from length centers taken from middle third of cross section show:
48.87% moisture content of which 15.79% being phenolic monomer with Sodium Bromate salts additive.

Using ASTME 162B Radiant Panel test stand, 3 slices of Douglas Fir 1 inch × 6 × 18 inches were then tested.

RESULTS:
A flame spread of 6 with heat increment of 3.

EXAMPLE II

Process Run: No. 1065
Species: 1 × 6 × 30 inches Red Oak
Condition: Green
Moisture content by analysis: 27.58%

Red Oak placed in autoclave. Autoclave sealed. Vacuum drawn to 26 inches mercury. Solution drawn into chamber by vacuum until Red Oak is totally immersed. Solution valve closed. Vacuum continued until 29 inches mercury and held 15 minutes. Vacuum secured. Chamber pumped with solution to 100% of full. Pressure pump started and pressure built to 300 psi and pump secured until psi would fall to 200 psi. This action continued until psi would remain static at 300 psi - 4 cycles of pump and hold ensued. Solution then drained from chamber, chamber opened and Red Oak removed. Red Oak was left to dry for 72 hours and moisture content then analyzed.

Findings: Moisture content 59.26% of which 22% was phenolic monomer and 5.7% Brominated Phosphate.

Testing was then conducted on ASTME 162B Radiant Panel for flame spread.

RESULTS:
Flame spread of 3, no fuel contribution and no smoke.

EXAMPLE III

Process Run: No. 1062
Species: Douglas Fir ⅜ inch Plywood. ⅜ × 24 inches × 4'
Condition: Cured
Moisture content: 11.75%

Plywood placed in autoclave chamber. Chamber secured. Vacuum drawn to 29 inches mercury. Solution drawn into chamber until plywood totally immersed. Solution valve secured and vacuum held for 20 minutes. Vacuum secured. Pressure built to 100 psi, held for 2 minutes and secured. Chamber drained of solution and plywood removed. Plywood allowed to dry for 72 hours and tested for moisture content. Moisture content 76.92% of which 35% is phenolic monomer of which 10% is Brominated Phosphate salts. Plywood then let stand for 3 months and analyzed for moisture again.
RESULTS:
Moisture 35% of which all of moisture content was Phenolic Polymers with Brominated Phosphate salts.

Plywood then was tested on the ASTME 162B Radiant Panel.
RESULTS:
Flame spread of 13.27 with no smoke and no fuel contribution.

EXAMPLE IV

Process Run: No. 1180
Species: 12 × 12 inches × 8'
Condition: Green

Moisture content tested same as PR1179. Moisture at test time 30%

Yellow Pine loaded into chamber, chamber secured, vacuum started and taken to 26 inches mercury. (Solution this run $H_2O$ only). Solution drawn into chamber under vacuum conditions until timber totally immersed. Solution valve closed, vacuum continued to 29 inches mercury, held 3 minutes. Chamber vented to atmosphere for 2 minutes, vacuum built up to 29 inches mercury, chamber filled to 100%. Solution valve closed, high pressure valve open and high pressure pump started and pressure brought to 300psi and held 20 minutes. Pressure released, solution withdrawn. Chamber opened, timber removed. Timber let stand 24 hours and tested for moisture. Moisture content 49.72% $H_2O$.

Timber then placed in a Mine Test apparatus and fired.
RESULTS:
33% less burn and flame spread than untreated Yellow Pine in same test configuration.

I claim:

1. A process for the impregnation of wood with chemicals to the core of the heart wood of said wood which comprises,
   enclosing the wood in a chamber
   sealing said chamber,
   evacuating said chamber slowly, over a period of 20–30 minutes, to a level below 10 inches of mercury,
   admitting to said chamber sufficient liquid in the form of an aqueous solution of a resin prepolymer to immerse said wood,
   maintaining vacuum over said immersed wood for a period up to about one hour, to accomplish removal of moisture and volatiles from said wood,
   and to cause said solution to enter said wood, the end point of said condition being indicated by the cessation of any sound within the chamber,
   admitting an additional amount of said solution to said chamber and developing pressure in said chamber to the point of refusal of the wood to receive or absorb further liquid,
   removing liquid from said chamber,
   removing impregnated wood from said chamber.

2. The process in accordance with claim 1 wherein said solution is admitted to the chamber at ambient temperature.

3. The process in accordance with claim 1 wherein said solution contains a resin prepolymer diluted to a solid content in the range of 5–40%.

4. The process in accordance with claim 1 wherein the concentration of resin components in said solution is from any useful level to about 50% of solids in the liquid, the viscosity of said solution being held to about viscosity of water or a level not more than 50% higher.

5. The process in accordance with claim 4 in which the resin prepolymer solution is a phenol-formaldehyde resin prepolymer, wherein there may be excess to aldehyde.

6. The process in accordance with claim 1 wherein the vacuum pressure cycle is repeated.

7. The process in accordance with claim 1 wherein said impregnation solution contains phenol-formaldehyde resin prepolymer, and a flame retarding agent.

8. The process in accordance with claim 7 wherein said impregnation solution contains a coloring agent.

9. The process in accordance with claim 1 wherein said impregnation solution contains phenol-formaldehyde resin prepolymer, and a coloring agent.

10. The method in accordance with claim 1 wherein the wood under pressurized condition in said chamber is maintained therein for a period up to about 30 minutes after apparent refusal of further impregnating solution by the wood.

11. The method in accordance with claim 10 wherein the solution is removed from the chamber and vacuum applied to said chamber to remove excess surface liquid from said wood and, thereafter, said vacuum released and wood removed from said chamber.

12. The method in accordance with claim 1 wherein said wood is maintained in said chamber following refusal of said additional impregnating solution and, thereafter while keeping the wood substantially immersed in solution, vacuum reestablished in said chamber, pressure reestablished in said chamber after an interval of vacuum, and the vacuum pressure cycle thus repeated to the point of further refusal of impregnating solution by the wood.

13. The method in accordance with claim 1 wherein said chamber is evacuated and maintained evacuated for a period of time to remove moisture and volatiles from said wood before admitting said solution.

14. A product comprising wood fully impregnated to its core with resin filling natural interstices in the wood, made according to the process of claim 1.

15. The product in accordance with claim 14 wherein the resin is phenol-formaldehyde.

16. The product in accordance with claim 15 in which the impregnation solution includes a flame retardant in an amount of 1 to 3 percent by weight.

17. The product in accordance with claim 16 in which the flame retardant is bis-dibromopropyl phosphate.

* * * * *